E. A. BENSON.
NUT LOCK.
APPLICATION FILED SEPT. 11, 1912.

1,066,982.

Patented July 8, 1913.

Witnesses
Ernest Crocker

Inventor
Elmer A. Benson
By Victor J. Evans
Attorney

UNITED STATES PATENT OFFICE.

ELMER A. BENSON, OF PERU, ILLINOIS.

NUT-LOCK.

1,066,982.  Specification of Letters Patent.  Patented July 8, 1913.

Application filed September 11, 1912. Serial No. 719,784.

*To all whom it may concern:*

Be it known that I, ELMER A. BENSON, a citizen of the United States, residing at Peru, in the county of Lasalle and State of Illinois, have invented new and useful Improvements in Nut-Locks, of which the following is a specification.

The present invention relates to simple and effective means for securing a bolt and nut in locked position upon each other, and resides in the novel construction, and arrangement of parts hereinafter fully described and claimed.

Figure 1:
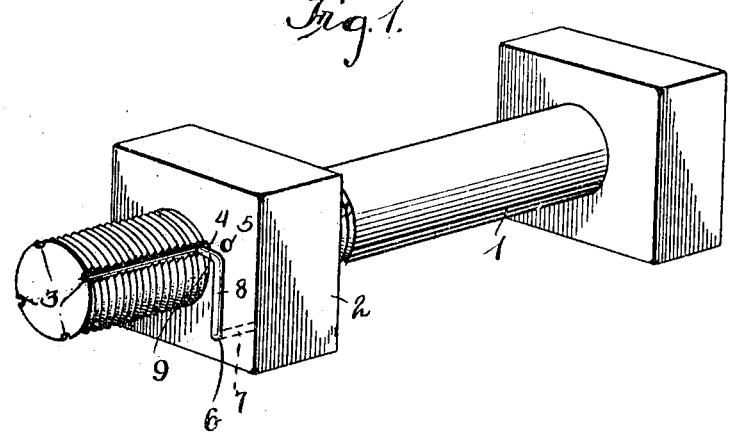
Figure 2:
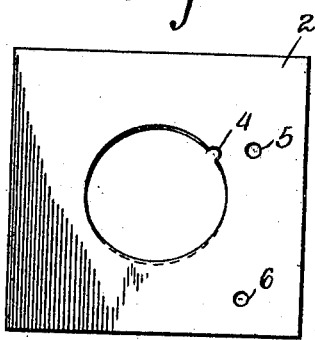
Figure 4:
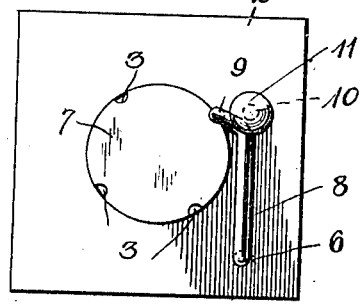
Figure 3:
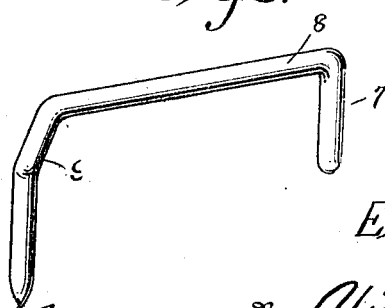

In the drawing, Figure 1 is a perspective view of a nut and bolt connected in accordance with the present invention. Fig. 2 is a plan view of the nut, the locking member being removed. Fig. 3 is a perspective view of the locking member. Fig. 4 is a face view illustrating the means which may be employed for retaining the lock in engagement with the nut and bolt.

Referring now to the drawing in detail, the numeral 1 designates an ordinary bolt, and 2 the nut for the bolt. The bolt 1 has its threaded shank formed with one or more longitudinally extending grooves or depressions 3, while the nut 2 is also provided with one or more depressions 4 which is adapted to register with any of the depressions or grooves 3 of the bolt when the nut is screwed home upon the bolt. The outer face of the nut 2 is provided with a pair of spaced orifices or pockets 5 and 6 respectively. The pocket 5 is arranged adjacent the groove 4 of the nut, while the pocket 6 is adapted to receive and to retain one of the offset ends 7 of a spring lock member 8. The opposite end of the lock is also arranged at an angle to what may be termed the body of the lock, and its end, designated by the numeral 9, is preferably pointed. The lock 8 is constructed from a single piece of material, preferably resilient wire, and is of a length sufficient to permit its pointed end 9 being received within the pocket 5 when the nut is screwed home upon the bolt. The pointed end is of a size and shape to snugly engage within the registering grooves or depressions of the bolt and nut, and the body of the spring is adapted to exert a tension to normally force the said end within the grooves. When it is desired to remove the nut from the bolt, it is merely necessary to insert some sharp instrument between the body of the lock and the pointed end thereof, so that the said end can be pried from without the registering grooves of the bolt and nut, and the said pointed end may be again deposited within the pocket 5, so that the lock will not interfere with the instrument employed in disconnecting the nut from the bolt.

In some instances it has been found desirable to provide the lock with securing means whereby the same can not be removed from engagement with the nut and bolt without first operating the said securing means. To accomplish this, I provide a headed member 11 which has its stem inserted within the pocket 5 (see Fig. 4). The stem of this member may be constructed of some malleable material, so that a blow upon the head 10 will cause the stem to expand and frictionally engage the wall of the pocket 5. The head 11 is adapted to overlie the body of the lock adjacent the pointed end 7, so that the removal of the lock cannot be accomplished until the headed member 11 is withdrawn from the pocket 5.

Having thus described the invention, what I claim is:—

1. In a lock for the purpose described the combination with a bolt and a nut, the said bolt having its threaded shank provided with longitudinally extending grooves, the threaded bore of the nut being also provided with grooves, a lock member secured to the nut, said lock member comprising a resilient element having an offset pointed end which is adapted to be received within the co-acting grooves of the nut and bolt when the same are to be sustained in a locked position, and the nut being further provided with a pocket which is adapted to receive the engaging end of the lock when the nut is in an unlocked position with relation to the bolt.

2. In a device for the purpose set forth, a bolt and a nut therefor, the bolt having its shank grooved, the nut having its threaded bore grooved, a spring lock comprising a single member having one of its ends secured to the nut, the opposite end of the lock being arranged at an angle to its body, and being pointed, the said pointed end adapted to be received within the registering grooves of the bolt and nut, when the nut is to be locked upon the bolt, and means comprising a removable element for retaining the said lock in engagement with the nut and bolt.

3. In a device for the purpose set forth, the combination with a bolt having a grooved shank, and a nut for the bolt having its threaded bore grooved, of a lock, said lock embodying a resilient member having both of its ends offset, and one of its ends secured to the nut, the nut being provided with a pocket arranged adjacent its groove, said pocket adapted to normally receive the second offset end of the lock, the said offset end also adapted to be received within the registering grooves of the nut and bolt, and a headed element having its shank engaging within the pocket and adapted to have its head overlie and contact with the lock adjacent its engaging end.

In testimony whereof I affix my signature in presence of two witnesses.

ELMER A. BENSON.

Witnesses:
JOHN W. PORTER,
F. J. PIERARD.